United States Patent Office 3,485,795
Patented Dec. 23, 1969

3,485,795
HINDERED BISPHENOL ANTIOXIDANTS
AND THEIR PREPARATION AND USE
IN POLYOLEFINS
Jack C. Gilles, Shaker Heights, Ohio, assignor to The
B. F. Goodrich Company, New York, N.Y., a corporation of New York
No Drawing. Original application May 3, 1966, Ser.
No. 547,378. Divided and this application Aug. 29,
1968, Ser. No. 777,531
Int. Cl. C08f 45/58
U.S. Cl. 260—45.95          5 Claims

ABSTRACT OF THE DISCLOSURE

Polyolefins are oxidatively stabilized with novel hindered phenols.

This is a division of application Ser. No. 547,378, filed May 3, 1966, now Patent No. 3,457,316.

This invention relates to a new class of hindered bisphenols and to a process for their preparation. More particularly, the invention relates to hindered alkyl bisphenols prepared from 2,6-di-tert-alkylphenols and aromatic epoxides and to the utilization thereof, particularly as antioxidants.

Phenols react with epoxides under alkali-catalyzed conditions to give mixtures of ether-alcohols, phenol-alcohols and other products. The reaction of carbanions with epoxides is also described in the literature. With both these reactions it would be expected, and it has been found, that one mol of the epoxide combines with only one mol of the phenol or carbanion. Contrary to these findings, I have now discovered quite unexpectedly that two mols of the carbanion of particular hindered phenols can be made to react with one mol of an aromatic epoxide to give novel hindered bisphenols.

The compounds of this invention are hindered bisphenols corresponding to the formula

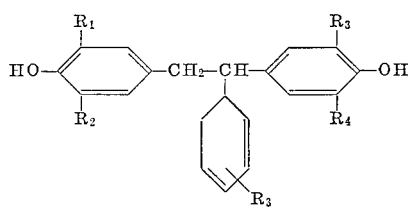

wherein $R_1$, $R_2$, $R_3$ and $R_4$ are tertiary alkyl groups, either the same or different, containing from 4 to 8 carbon atoms and $R_5$ is hydrogen or an alkyl radical containing 1 to 3 carbon atoms. A preferred compound is 1,2-bis(3,5-di-tert-butyl-4-hydroxyphenyl) 1-phenylethane, having the formula

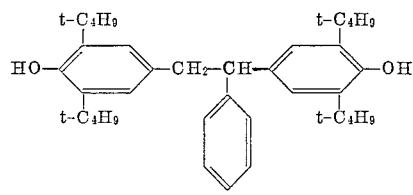

1,2 - bis(3.5 - di-tert-alkyl-4-hydroxyphenyl)-1-arylethanes are formed by reacting 2,6-di-tert-alkyl cyclohexadienone carbanions of 2,6-di-tert-alkylphenols with aromatic epoxides in an inert solvent, two mols of the carbanion reacting for each mol of epoxide.

Dialkyl phenols which may be employed have the formula

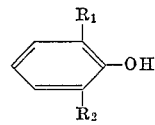

wherein $R_1$ and $R_2$ are tertiary alkyl groups, either the same or different, containing from 4 to 8 carbon atoms. Examples of useful 2,6-di-tert-alkylphenols include 2,6-di-tert-butylphenol,
2,6-di-tert-amylphenol,
2-tert-butyl-6-tert-amyl phenol,
2,6-di-(1-methyl-1-ethyl propyl) phenol,
2,6-di-(1,1,3-trimethyl propyl)phenol,
2,6-di-(1,1,2-trimethyl propyl) phenol,
2,6-di-(1,1-diethyl propyl) phenol,
2,6-di-(1,1,2,2-tetramethyl propyl) phenol,
2,6-di-(1,1-dimethyl butyl) phenol,
2,6-di-(1-methyl-1-ethyl butyl) phenol,
2,6-di-(1,1,3-trimethyl butyl) phenol,
2,6-di-(1,1,2-trimethyl butyl) phenol,
2,6-di-(1,1-dimethyl pentyl) phenol, and the like.

The 2,6-di-tert-alkyl cyclohexadienone carbanions are formed from the above described 2,6-di-tert-alkylphenole by reacting the phenol with an alkali or alkaline earth metal, metal hydride, metal alcoholate, metal alkyl or the like, in an inert reaction medium such as N,N-dimethylformamide, N,N-diethylformamide, N,N-dimethylacetamide, dimethylsulfoxide, dioxane, diethyl ether, toluene or the like. If desired, the solvent may be removed after formation of the carbanion and prior to its use by distillation. It has been found especially suitable to use sodium hydride in N,N-dimethylformamide in forming the 2,6-di-tert-alkyl cyclohexadienone carbanions.

Aromatic epoxides which may be used in the present invention includes those having the formula

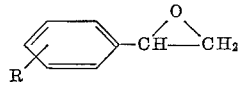

while R is hydrogen or an alkyl radical containing 1 to 3 carbon atoms, such as methyl, ethyl, propyl and isopropyl. Styrene oxide is preferred.

The 2,6-di-tert-alkyl cyclohexadienone carbanion to be reacted is readily prepared from the 2,61di-tert-alkyl phenol prior to the reaction with the aromatic epoxide. The 2,6-di-tert-alkyl cyclohexadienone carbanion is dissolved in a dry inert organic solvent and the aromatic epoxide added. N,N-dimethylformamide is an especially preferred solvent, however, other suitable reaction media include N,N-dimethylacetamide, N,N-di-ethylformamide, dimethylsulfoxide, dioxane and the like.

The reaction may be carried out at room temperature, however, better yields and reaction times are obtained when higher temperatures, up to about 180° C., are used. The preferred temperature is in the range between about 80° C. and about 160° C. Reactions are normally run at atmospheric pressure, though subatmospheric or superatmospheric pressures can be used. With preferred reaction conditions, reaction times are generally less than about 16 hours. While the molar ratio of 2,6-di-tert-alkyl cyclohexadienone carbanion to aromatic epoxide can range from about 1:1 to about 5:1, a molar ratio of greater than 1 mol of carbanion is preferred and at between about 1.5:1 to about 3:1 optimum yields are obtained.

At the completion of the reaction, the contents of the reactor are neutralized as by pouring into wet ice or preferably a wet ice-dilute hydrochloric acid mixture. The bisphenols are recovered by extracting the mixture several times with ether, drying over anhydrous sodium sulfate and evaporating the ether.

The hindered bisphenols are high melting crystalline solids soluble in aromatic hydrocarbons such as benzene, toluene, etc. and ketones such as acetone, methyl ethyl ketones and the like. They possess properties which render them valuable as antioxidants in olefin polymers such as polyethylene, polypropylene, polystyrene, polyisobutylene, isobutylene-styrene copolymers, isobutylene-isoprene copolymers, polybutadiene, butadiene-styrene copolymers, butadiene-acrylonitrile copolymers, butadiene-vinyl pyridene copolymers, butadiene-acrylic acid copolymers, butadiene-alkyl acrylate or methacrylate copolymers, butadiene-chlorostyrene copolymers, butadiene-methyl vinyl ketone copolymers, polyisoprene, polychloroprene and the like, and other materials.

The bisphenol compounds are easily incorporated into polyolefin rubbers and plastics by conventional techniques and need no special processing. They are readily incorporated into the polymers by mixing as on a rubber mill or in a Banbury mixer; in solutions or dispersions of the polymer, as is, in solvents, masterbatched with other compounding ingredients and the like. They may be used in polymer compounds with any of the conventional processing oils, plasticizers, lubricants, anti-sticking agents, fillers, reinforcing agents, sulfur and other curing agents, accelerators, stabilizers, antioxidants, antiozonants and the like. They are compatible with known antioxidants and antiozonants, and in combination with certain of these show synergistic activity. The amount of hindered bisphenol incorporated into the olefin polymer will vary between about 0.1% and about 5% based on the weight of the polymer.

The following examples serve to illustrate the invention more fully, however, they are not intended to limit the scope thereof.

EXAMPLE I

To a reaction vessel equipped with a stirring means and a take-off condenser were added about 250 ml. of dry N,N-dimethylformamide, 51.5 grams (0.25 mol) 2,6-di-tert-butylphenol and 13.8 grams (0.25 mol) 97% sodium methoxide to form the carbanion. The reaction mixture was heated at about 150° C. and methanol taken off. When all the methanol had been removed the temperature of the reaction mixture was lowered to about 120° C. and 30 grams (0.25 mol) styrene oxide added in about 60 minutes. The reaction mixture was then heated at reflux for 4 hours. After cooling, the contents of the reactor were poured into ice and HCl and extracted with diethyl ether. The ether extract was washed several times with water and dilute hydrochloric acid, dried over anhydrous sodium sulfate and the ether evaporated. Upon cooling, the viscous residue from the evaporation yielded about 5 grams of white needles melting at 154–155° C. Mass spectrometry indicated the mass of the product to be about 514 (calculated molecular weight 514.76) with fragment ions whose mass support the proposed structure. The nuclear magnetic resonance spectrum also showed the product to be 1,2-bis(3,5-di-tert-butyl-4-hydroxyphenyl)-1-phenylethane.

EXAMPLE II

A reactor was equipped with a take-off condenser and a stirrer. To this reactor were added 400 ml. dry N,N-dimethylformamide, 54 grams (1.0 mol) 97% sodium methoxide and 227 grams (1.1 mol) 2,6-di-tert-butylphenol. The reaction mixture was heated at reflux until no further methanol came off. The temperature of the reactor was raised to about 120–130° C. and 60 grams (0.5 mol) styrene oxide dissolved in 100 ml. dimethylformamide added in one hour. Stirring and heating at about 150° C. were continued for 24 hours. The contents of the reactor were worked up similar to Example I. The 1,2-bis(3,5-di-tert-butyl-4-hydroxyphenyl)-1-phenylethane was recrystallized from ligroin to give about 100 grams of a white solid melting at 154–155° C.

EXAMPLE III

Similarly, to a suspension of 1500 ml. of dry N,N-dimethylformamide and 24 grams (1.0 mol) sodium hydride was added dropwise 618 grams (3.0 mols) 2,6-di-tert-butylphenol. At the completion of the addition the reaction mixture was gently heated until no further hydrogen was evolved. The temperature of the reactor was raised to about 120° C. and 120 grams (1.0 mol) styrene oxide added dropwise in one hour. Heating was continued for about 24 hours and the 1,2-bis(3,5-di-tert-butyl-4-hydroxyphenyl)-1-phenylethane recovered.

EXAMPLE IV

This example illustrates the use of 1,2-bis(3,4-di-tert-butyl-4-hydroxyphenyl)-1-phenylethane as an antioxidant for polyethylene. Weights are percent by weight based on 100 parts polyethylene. Antioxidants were weighed, dissolved in acetone and then added to unstabilized high-density polyethylene suspended in acetone. The mixture was then stripped to dryness in a flash vaporator and mixed for about 5 minutes at 290–300° F. on a mill. The polymer was then compression molded into 0.010″ and 0.025″ sheets. Six-inch dumbbells were cut from the sheets and mounted in racks. Both ends of the dumbbell were fastened so that each specimen took the shape of a horseshoe. The samples were then placed in an air-circulating oven maintained at 125°. At regular intervals the samples were removed from the oven, allowed to cool to room temperature and the loop pinched. The sample fails if the loop breaks. The test is resumed and continues until all the samples fail. Table I reports and results for one such oven-aging test comparing 1,2-bis(3,5-di-tert-butyl-4-hydroxyphenyl)-1-phenylethane with commercial antioxidants having similar features.

TABLE I

| | Hours to failure |
|---|---|
| Control (no antioxidant) | 96 |
| 1,2-bis(3,5-di-tert-butyl-4-hydroxyphenyl)-1-phenylethane (0.1 phr.) | 330 |
| 4,4′-methylenebis(2,6-di-tert-butyl-phenol)[1] (0.1 phr.) | 168 |
| 1,2-bis(3,5-di-tert-butyl-4-hydroxyphenyl)-1-phenylethane (0.1 phr.)+dilauryl thiodipropionate (0.3 phr.) | 2060 |

[1] Commercial antioxidants.

A modified Scott Testor Block was used to measure the oxygen absorption. One inch circles were cut from the 0.010″ sheets and pressed onto aluminum screen with heat and pressure. Six samples were placed in each testing tube and the system thoroughly flushed and filled with oxygen. The tubes were maintained at 140° C. and the introduction periods determined by noting the oxygen absorption at regular intervals. Oxygen absorption data are set forth in Table II.

TABLE II

| | Induction period (hours) |
|---|---|
| Control (no antioxidant) | 6 |
| 1,2-bis(3,5-di-tert-butyl-4-hydroxyphenyl)phenyl-1-ethane (0.1 phr.) | 40 |
| 1,2-bis(3,5-di-tert-butyl-4-hydroxyphenyl)-1-phenylethane (0.1 phr.)+dilauryl thiodipropionate (0.3 phr.) | 325 |
| Dilauryl thiodipropionate (0.3 phr.) | 58 |

EXAMPLE V

The 1,2-bis(3,5-di-tert-butyl-4-hydroxyphenyl)-1-phenylethane was tested in white stock such as might be used in white sidewalls for tires. The stock was compounded as follows:

| | Parts by weight |
|---|---|
| Natural rubber | 100 |
| Zinc oxide | 85.0 |
| Titanium dioxide | 15.0 |
| Stearic acid | 2.0 |
| Sulfur | 3.0 |
| 2,2′-dithiobis(benzothiazole) | 1.0 |
| Ultramarine blue | 0.2 |
| Antioxidant | 0–1.0 |

All blanks and test samples were cut from 6″ x 6″ x .060–.075″ ASTM sheets cured 45 minutes at 284° F. and aged for 60 hours at 100° C. in circulating air. The results are set forth in Table III and include data on the tensile properties of the vulcanized white stocks before and after oxygen aging.

TABLE III

| | No antioxidant | 1.0 phr. 1,2-bis (3,5-di-tert-butyl-4-hydroxy-phenyl)-1-phenyl-ethane |
|---|---|---|
| Original Physical Properties: | | |
| 300% Modulus (p.s.i) | 450 | 430 |
| Tensile Strength (p.s.i.) | 3,740 | 3,660 |
| Elongation at Break (percent) | 730 | 720 |
| Aged 60 Hours at 100° C. in Air: | | |
| 300% Modulus (p.s.i.) | 640 | 800 |
| Tensile Strength (p.s.i.) | 640 | 2,500 |
| Elongation at Break (percent) | 300 | 510 |

It is evident from Tables I and II, the 1,2-bis(3,5-di-tert-butyl-4-hydroxyphenyl)-1-phenylethane improves the oxidative stability of high-density polyethylene. In the air-circulating oven test, it performs better than similar antioxidants which are currently being used by the industry. When combined with dilauryl thiodipropionate, the 1,2 - bis(3,5 - di - tert-butyl-4-hydroxyphenyl)-1-phenylethane gives a synergistic effect. Evaluated in a natural rubber white sidewall stock as shown in Table III, the 1,2 - bis(3,5 - di - tert-butyl-4-hydroxyphenyl)-1-phenylethane shows excellent activity as an antioxidant.

When the 1,2-bis(3,5-di-tert-butyl-4-hydroxyphenyl)-1-phenylethane is compounded with a typical oil-extended styrenebutadiene copolymer rubber used for tire treads, similar oxidative stability is obtained.

I claim:
1. An olefin polymer composition containing as an antioxidant from about 0.1% to about 5% based on the weight of the polymer of a compound having the formula

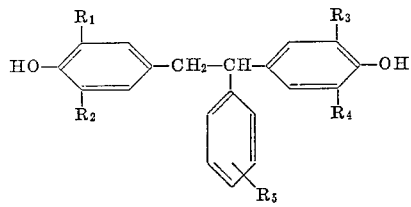

wherein $R_1$, $R_2$, $R_3$ and $R_4$ are tertiary alkyl groups, either the same or different, containing from 4 to 8 carbon atoms and $R_5$ is hydrogen or an alkyl group containing 1 to 3 carbon atoms.

2. The composition of claim 1, wherein the olefin polymer is polyethylene.

3. The composition of claim 1, wherein the olefin polymer is natural rubber.

4. The composition of claim 1, wherein the olefin polymer is a butadiene polymer rubber.

5. The composition of claim 1, wherein the antioxidant is 1,2-bis(3,5-di-tert-butyl-4-hydroxyphenyl)-1-phenylethane.

References Cited

UNITED STATES PATENTS

| 2,801,989 | 8/1957 | Farnham | 260—47 |
| 2,966,477 | 12/1960 | Morris | 260—45.95 |
| 3,239,484 | 3/1966 | Stark | 260—45.95 |

FOREIGN PATENTS 687,474  5/1964  Canada.

HOSEA E. TAYLOR, JR., Primary Examiner

U.S. Cl. X.R.

260—619, 810, 814, 45.85

PO-1050
(5/69)

UNITED STATES PATENT OFFICE
CERTIFICATE OF CORRECTION

Patent No. 3,485,795          Dated December 23, 1969

Inventor(s) Jack C. Gilles

It is certified that error appears in the above-identified patent and that said Letters Patent are hereby corrected as shown below:

Column 1, line 50, "$R_3$" should read ---$R_5$---.

Column 2, line 26, "alkylphenole" should read ---alkylphenols---
line 34, after "use" insert ---sodium methoxide or---; line 48, "2,61di-tert-alkyl" should read ---2,6-di-tert-alkyl---.

Column 4, line 26, "vaporator" should read ---evaporator---; line 37, "reports and results" should read ---reports the results---; line 57, "introduc-" should read ---induc- ---; line 65, "phenyl-1-ethane" should read ---1-phenylethane---.

SIGNED AND
SEALED
JUN 30 1970

(SEAL)
Attest:

Edward M. Fletcher, Jr.
Attesting Officer

WILLIAM E. SCHUYLER, JR.
Commissioner of Patents